Nov. 4, 1952  G. B. HILL ET AL  2,616,765
SILAGE BLOWER WITH AUGER FEED TABLE
Filed June 10, 1950  2 SHEETS—SHEET 1

INVENTORS
James R. West
George B. Hill
By Allan R. Redrow
ATTORNEY

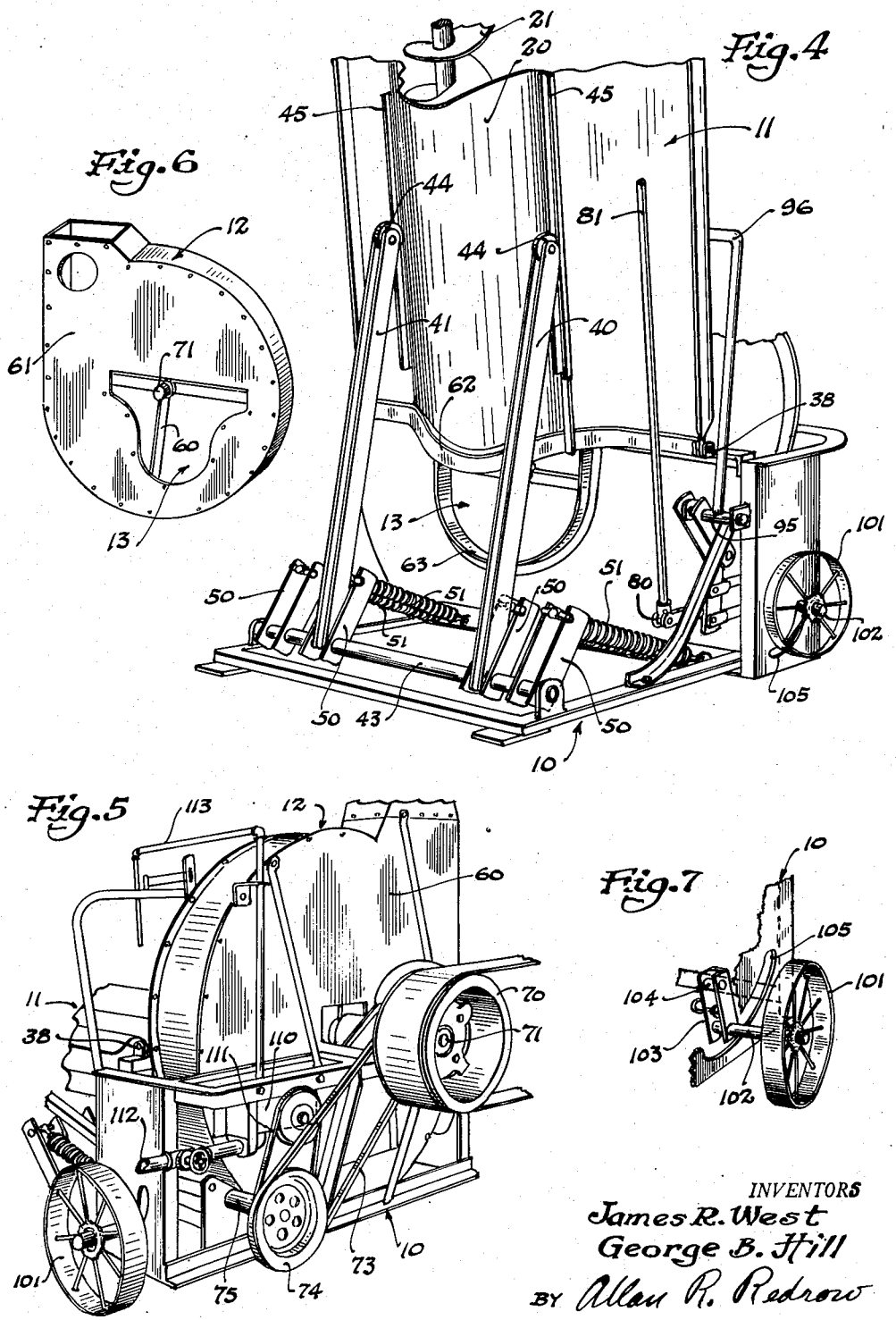

Patented Nov. 4, 1952

2,616,765

UNITED STATES PATENT OFFICE 2,616,765

SILAGE BLOWER WITH AUGER FEED TABLE

George B. Hill and James R. West, New Holland, Pa., assignors to New Holland Machine Division of The Sperry Corporation, New Holland, Pa., a corporation of Delaware Application June 10, 1950, Serial No. 167,286

4 Claims. (Cl. 302—37)

This invention relates to the conveying of forage and more particularly to a method for and an improved auger feed and blower mechanism for handling chopped ensilage and the like.

The purpose of this invention is to provide an improved mechanism and method for moving materials such as chopped ensilage to accomplish the filling of a silo, barn, or other storage facilities, and it also may be used, for example, to blow grains into their granaries. Numbered among the important features of this invention are the improved table structure that may be raised and lowered to permit a loaded truck to be rapidly brought up to the blower and set in position for unloading, and also the particular auger feed means that cooperates with the feed opening into the blower to rapidly feed the material to the blower in a smooth, even, controlled manner.

The blower conveyor itself also has several structural features that provide for the more efficient handling of chopped ensilage material. An improved outlet structure is built into the blower housing that directs the rapidly moving stream of ensilage into the conveyor pipe and, as above suggested, the feed opening to the blower housing is positioned relatively to the fan so that the ensilage is taken into the blower conveyor and delivered to the outlet most expeditiously.

The various objects of the invention will appear in the specification below wherein:

Figure 4 is a front perspective showing the feed table in raised position;

Figure 5 is a rear perspective showing the pulley drive system and the associated molasses pump;

Figure 6 is a front elevation of the blower showing the eccentric position of the feed opening to the fan housing; and Figure 7 is a detail view of the wheel mounting structure.

Figure 1:
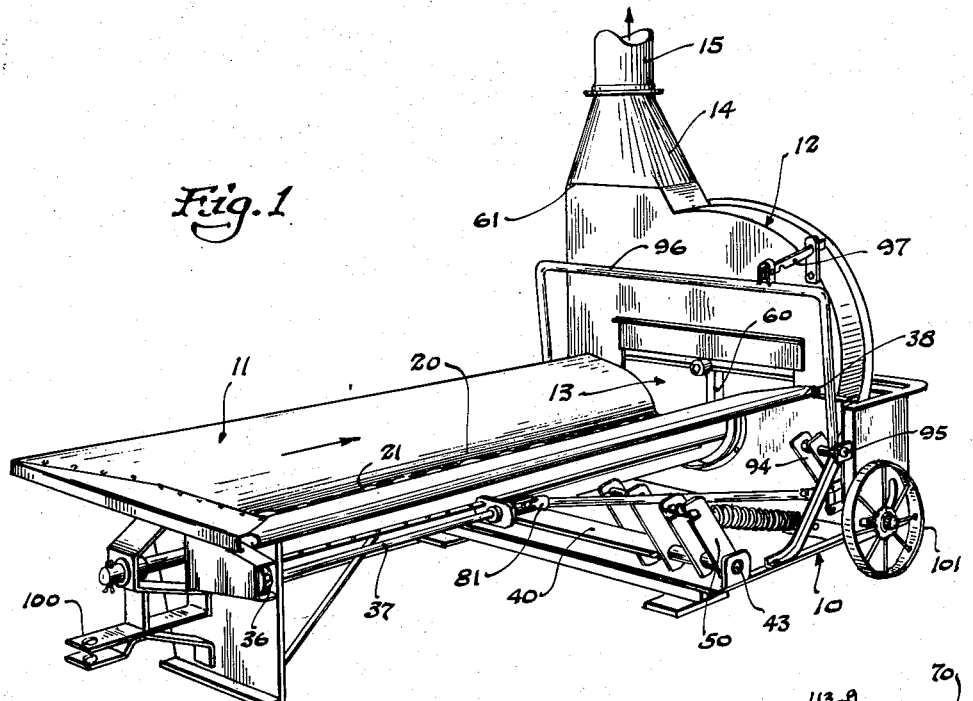
Figure 1 is a front perspective view of the machine.

The preferred form of the invention is shown in the drawing, and referring to Figure 1, the machine is shown as being mounted on a suitable frame 10, which supports one end of a swinging feed table section 11 that receives the material to be blown into a silo or the like. The material feeds across the table in the direction of the arrow to pass into the blower housing 12 through the feed opening 13 that is provided in the front face of the housing. The forage, such as chopped ensilage, is rapidly picked up by the fan and delivered to the outlet of the housing where it passes through a transition fitting 14, into the delivery pipe or stack 15.

The feed table structure is made to have a relatively wide upper surface for receiving cut ensilage material as it is unloaded from a truck and the material falls downwardly across the sides of the table into a bottom trough 20 that is formed at the center of the table. The trough is provided with a cooperating auger 21 which is best shown in Figure 2, the auger being driven to rotate in a manner to feed the material in the trough forwardly across the table into the feed opening.

Figure 2:
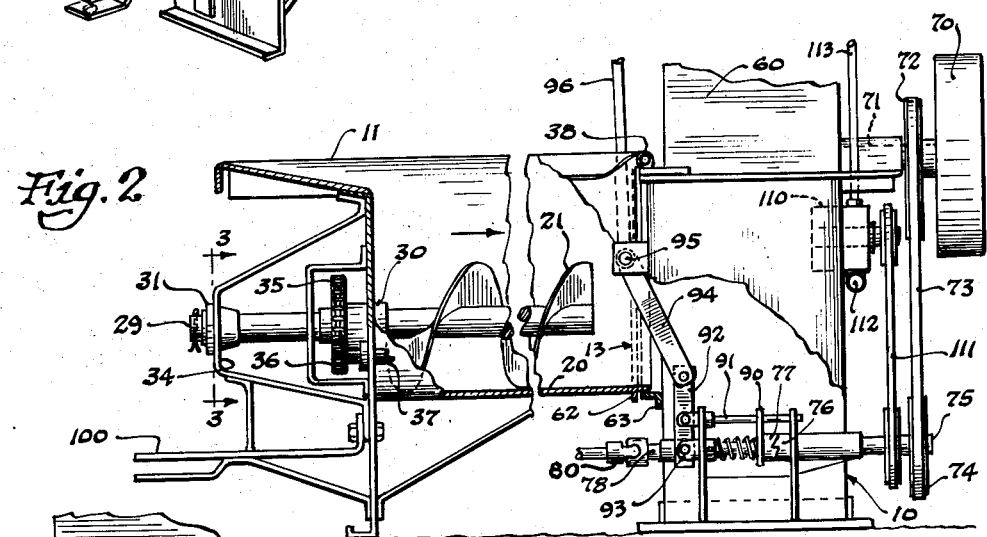
Figure 2 is a side elevation partly broken away showing the feed table structure and its cooperating free end auger and the auger drive means.
Figure 3:
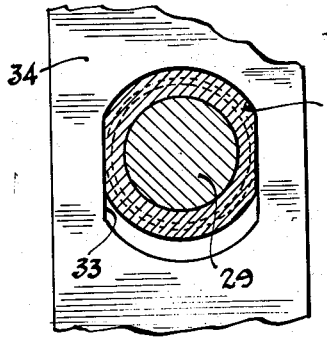
Figure 3 is an enlarged end view of the outboard auger bearing taken on line 3—3 of Figure 2.

As best shown in Figure 2, the auger is primarily supported in bearings located at the outer end of the table so that its other end is freely suspended and offers no obstruction to material feeding from the auger through the feed opening 13 into the fan. For this purpose, the rigid axle 29 of the auger is carried in a bearing 30 that is supported in the outer end wall of the trough and the tip or stub end of the axle is carried in a bearing 31 which is supported in a slot 33 (see Figure 3) formed in the outboard bearing support 34. Each of the bearings 30 and 31 are floatingly mounted in their supports, and because of this somewhat flexible mounting of the auger, it is free to have a limited oscillating movement about bearing 30 as a center, the movement being limited by the engagement of the bearing 31 with either end of the slot 33. It will be noted that the arrangement of the bearings, the stub axle, and the slot 33 are such as to hold the auger in the trough with the auger flights engaging the walls of the trough substantially throughout the length thereof. When, however, any material becomes lodged or trapped under any of the flights of the auger, the auger is free to raise up while still feeding the material along in the trough and thus all possibility of jamming the auger is obviated.

It will be noted that the length of the auger is such that the free end of the auger is spaced from the plane of the feed opening for a purpose that will appear more fully below. Also the free end is provided on the auger structure to permit the material being handled to pass into the fan without meeting any obstructions.

In order to drive the auger, its outer end is provided with a sprocket wheel 35 which is keyed to axle 29. The sprocket 35 cooperates with a suitable sprocket chain which also passes over a drive wheel 36 (see Figure 1), which sprocket wheel 36 is driven by the drive shaft 37 as will appear more fully below.

The table 11 preferably is hinged to the housing 12 by the pivotal connections 38 provided at each side of the table, so that it may be raised, as a truck or wagon is pulled into position. After the vehicle to be unloaded has been set in position, the table may be drawn down to its horizontal position and unloading may proceed. To assist in the raising and lowering of this relatively heavy table structure, a swinging spring arm counterbalancing system is provided in the form of arms 40 and 41, which arms are mounted for vertical swinging motion on the rotatably mounted axle 43. At their outer ends, the arms 40 and 41 are provided with suitable track engaging roller means 44, which ride in the tracks 45 that are fixed integral to the table structure up along the outside of the trough portion of the table means. Integral with the axle 43 are several lever arms 50 which at their outer ends are connected to the tension springs 51, that in turn are fixed at their outer ends to the frame 10 of the machine. Thus, referring to Figure 4, as the table 11 is raised, the springs 51 contract and tend to rotate the axle 43 so as to drive the arms 40 and 41 upwardly whereby to assist in the lifting of the table to the vertical position. Similarly, when the table is to be lowered, the springs 51 are drawn out and serve to ease or cushion the downward swing of the table.

As the ensilage material moves out of the trough 20 into the housing 12, it is engaged by a suitable fan means 60 disposed inside the generally cylindrical housing 12. The material then feeds outwardly to the periphery of the housing due to the centrifugal action produced by the rotation of the fan, and as it flows outwardly, it is swept around in the housing for a short distance until it is ejected through the tangentially disposed outlet 61 of the housing into the sloping transition member 14 from where it flows into the conveyor pipe 15.

The feed opening 13 through which the material passes into the housing is positioned inwardly somewhat from the periphery of the cylindrical housing and the upper edge of the opening is adjacent to and slightly above the axis about which the fan 60 rotates. The opening 13 in the housing is shaped to conform generally to the shape of the trough, and the trough and opening are provided with a pair of interfitting angle bar members 62 and 63, which are best shown in Figure 2. The angle bars which are fixed to the inner end of the table and the feed opening, not only serve to stiffen these elements, but also to substantially seal the meeting edges of the trough and the opening when the table is dropped to its operative position.

It has been found that the position of the opening, as above described, is quite important in that as the fan sweeps around through the housing, the opening 13, being spaced inwardly from the periphery of the housing, prevents any air blowing out of the fan housing into the trough which would tend to counteract the action of feeding material into the fan. Further, as is clearly evident in Figure 6, the material is delivered into the fan adjacent the center portion thereof, at which point the fan blades are moving relatively slowly. With this disposition of the opening, the material to be fed through the fan conveyor system is picked up by the fan blades with a minimum change in velocity and is then delivered outwardly in a manner to relatively gradually increase its velocity until it reaches a maximum at the fast moving tips of the fan blades. Thus, the moving energy is smoothly applied to the material passing through the conveyor system.

This manner of handling delicate material such as cut hay crops and the like permits the material to be delivered into a silo or barn with a minimum possibility of damage to the valuable leafy portions thereof. In this connection, the positioning of the upper edge of the feed opening substantially at the center of the fan structure contributes to the action of the fan in minimizing damage to the material being conveyed because this feature substantially eliminates all tendency for the material feeding into the opening 13 to recirculate in the fan housing. With the structure here shown, most all of the ensilage fed into the housing is delivered out through the tangentially disposed outlet 61 in less than a single revolution of the fan in the housing. It will be seen also that as the material passes out of the outlet 61, the air flow is accelerated as it passes through the upwardly sloping transition piece 14. The slope of the transition piece is made so gradual as to produce as little disturbance to the stream flow as possible, and yet, due to the rapid change in velocity in the air stream as it passes from the fan housing into the conveyor or pipe 15 which has a much smaller cross sectional area than the flow passage in the fan housing that communicates therewith, the crop is picked up in the air stream and delivered into the conveyor pipe with very little if any rubbing action against the walls of the transition piece 14. The gradual upward slope of this transition piece is considered to be an important feature of this invention, which contributes to the lessening of the possibility of damaging crops flowing through the conveyor system.

The fan may be driven from any suitable source of power, but preferably, as best shown in Figure 5, the fan is driven from the power take-off of a tractor or an electric motor by a belt connected with a pulley wheel 70 which is keyed to the shaft 71 upon which the fan is mounted for rotation. As the shaft 71 is driven, the fan 60 is carried therewith to effect delivery of the material from the trough 20 into the conveyor pipe 15 and upwardly in the pipe to the top of the barn or silo into which the material is being fed.

The auger also is driven from pulley 70, and for this purpose, a V belt sheave 72 (see Figure 2) may be provided which may be keyed to shaft 71 and cooperates with a V belt 73. The belt 73 is trained over a sheave 74 which is keyed to a shaft 75 that is keyed to the driving member 76 of a clutch device. The driving face 76 is adapted to cooperate with the driven face 77 of the clutch which face 77 is splined to the driven output shaft 78 which is connected through a shaft connecting universal joints 80 and 81 to the drive shaft 37 mentioned above. The drive shaft 37 drives sprocket wheel 36 that drives the sprocket chain which is connected to the sprocket wheel 35 keyed to the auger axle 29.

The clutch members 76 and 77 are made so that the drive to the auger can be disengaged whenever desired, and for this purpose, the driven member 77 may be slid out of engagement on its shaft 78 with respect to the driving face 76 of the clutch. The clutch face 77 is provided with a yoke member 90 integrally carried on the slide rod 91 which is mounted for sliding movement in the end plates of the clutch housing.

One end of the rod 91 is pivotally connected to the lever 92 which is mounted at its lower end on a pivotal connection 93 and the upper end of the lever 92 is connected to a crank arm 94 that oscillates about a shaft 95 when the handle 96 is rocked back and forth. As the handle 96 is moved inwardly toward the housing, the crank arm 94 is rotated clockwise, referring to Figure 2, so that the rod 91 is moved to the left and the yoke 90 retracts the driven plate 77 from its contact with the driving member 76. This disengages the clutch and power for driving the auger feed is discontinued. When the arm 96 is moved away from the housing, the rod 91 is moved to the right, referring to Figure 2, so that the clutch face 77 is engaged with the driving plate 76 to provide power for driving the auger. A suitable latching member 97 may be provided to hold the arm 96 in either of its extreme positions to hold the clutch engaged or disengaged as desired.

The machine of this invention is adapted to be towed from one position to another after one silo has been filled, and for this purpose, a hitch member 100 may be mounted integral with the outer end of the table 11. When it is desired to move the blower, the table is locked in its downward position by suitable latching means, not shown, which may cooperate with the spring counterbalancing system, and the wheels 101 together with the hitch 100 serve to support the blower while it is being towed from place to place.

When the blower has been brought to a new position, the machine is backed into position for receiving ensilage material and the wheels 101 are retracted from their transport position to allow the frame 10 to drop onto the ground. For this purpose, the wheels 101 are carried on an axle 102 that is carried at the outer end of a swinging arm 103 that is pivotally connected to the frame 10 of the machine to swing about an axis 104. The swinging arm 103 may be positioned behind suitable paneling attached to the frame and a slot 105 must then be provided in the panel to allow the axle 102 to move from its retracted position to its transport position. Suitable latching means are provided to hold the wheel in transport position.

When the wheels have been retracted and the frame dropped onto the ground, the machine sits firmly in position and the operation may be started. As soon as the pulley drive system and pipe line conveyor 15 have been hooked up, the machine is ready for operation. When a truck load of ensilage is being brought in, the table 11 is raised and the spring urged counterbalanced arms 40 and 41 assist in lifting the table 11, as is shown in Figure 4. The clutch, of course, will be disengaged at this time, so that the auger need not be driven as the table is lifted.

After the loaded wagon has been positioned for unloading, the table is lowered to the position shown in Figure 1 and unloading of the ensilage from the wagon onto the table may proceed. The ensilage is dumped onto the table and falls into the trough where the auger blade 21 feeds the material forwardly so that it passes into the opening 13 to be picked up by the fan and delivered into the conveyor pipe 15.

Referring to Figure 2, it will be noted that as the material is fed forwardly, and when it moves past the front end of the auger, the material is carried forwardly in the trough and into the fan due to the pull created by the air passing into the opening 13. As the air rushes into the fan through this opening, the rear portion of the ensilage is held under the relatively slow moving auger while the air pulls out the ensilage that has passed the free end of the auger to pull out any matted ensilage material, and this pulling action serves to fluff up and loosen all of the material so that it can more easily pass through the fan housing. It is important to note that this loosening action eliminates the possibility of the feeding of lumps of ensilage material directly from the auger into the fan, and thus, an even flow of loose fluffy material is delivered to the fan whereby its operation is greatly improved.

It has been found that when the free end of the auger is from about five to eight inches away from the plane of the opening 13 to the fan housing, that the best delivery of the conventional form of chopped ensilage is accomplished. This spacing, which is selected primarily upon reference to the conventional length of the stems of the cut ensilage material, provides a relationship which permits all of the ensilage to be properly fluffed up without normally permitting any matted material to pass into the fan, and thus, a smooth, even operation of the blower conveyor system can be maintained whereby a most efficient use of energy and delivery of ensilage results.

In some cases, where certain types of ensilage is being fed into the silo, it is desirable to add molasses to the material as it flows into the conveyor, and in this instance, a molasses pump 110 (see Figure 5) may be mounted on the frame of the machine in a position to be driven by V belt 111 from a sheave integral with the clutch driving pulley 74. The molasses is delivered to the pump through a suitable pick up pipe 112, and the outfeed from the pump goes up over the fan housing through pipe 113 from where it is squirted onto the ensilage passing through the trough 20 just as it flows into the opening 13.

The machine here described has been designed primarily for delivering chopped or cut fodder of any type into the silo or barn storage facilities, however, the machine has also been used successfully for feeding grain kernels into suitable granaries.

While the above description covers the preferred form of this invention, it is obvious that many modifications thereof may occur to those skilled in the art which will fall within the scope of the following claims.

We claim:

1. An ensilage blower or the like having a trough provided with auger means carried on a rotating axle for feeding material into a blower conveyor, means to drive said blower and said auger, said auger being mounted in said trough to have a free end adjacent said blower whereby the material being conveyed may move freely into the blower, bearing supports for said auger, said supports being positioned to cooperate with said auger at the end opposite to the free end of said auger, said supports being relatively spaced lengthwise of said axle, bearings in said respective supports rotatably receiving said axle, and one of said spaced bearing supports being vertically movable to permit said auger to rise and fall in the trough.

2. In an ensilage blower having a feed trough and a free end auger carried on a rotatable axle for rotation in said trough, means supporting said axle at its outer end for rotating movement in said trough comprising, a pair of relatively axially spaced bearings, one of said bearings being supported against bodily movement in the end wall of said trough, whereby yielding of said end wall will permit a limited angular movement of said bearing, and means exteriorly of said trough supporting and guiding the other of said bearings for vertical movement within predetermined limits, whereby the auger is free to have a limited oscillating movement about said first bearing as a center and is restrained from lateral movement.

3. The combination set forth in claim 2 including a driven sprocket fixed on said axle, a drive sprocket disposed at one lateral side of said driven sprocket, and a chain operatively connecting said sprockets, whereby the axle is free to float without substantially varying the tension of said chain.

4. In an ensilage blower having a feed trough and a free end auger carried on a rotatable axle for rotation within said trough, a pair of relatively axially spaced bearings rotatably supporting said axle adjacent one end thereof for vertical floating movement in said trough, means supporting one of said bearings against bodily movement relative to the trough, and means supporting and guiding the other of said bearings for vertical movement within predetermined limits, whereby the auger is free to oscillate vertically about said first bearing and is restrained from lateral movement.

GEORGE B. HILL.
JAMES R. WEST.

REFERENCES CITED

The following references are of record in the file of this patent:

UNITED STATES PATENTS

| Number | Name | Date |
|---|---|---|
| 1,237,212 | Loewen | Aug. 14, 1917 |
| 2,060,569 | Greenlau | Nov. 10, 1936 |
| 2,373,169 | Coultas | Apr. 10, 1945 |
| 2,410,501 | Huddle | Nov. 5, 1946 |